INVENTOR
Otto Scheller
BY
ATTORNEYS

Patented May 7, 1929.

1,712,121

UNITED STATES PATENT OFFICE.

OTTO SCHELLER, OF BERLIN-LICHTERFELDE-WEST, GERMANY, ASSIGNOR TO C. LORENZ AKTIENGESELLSCHAFT, OF LORENZWEG, BERLIN-TEMPELHOF, GERMANY.

APPARATUS FOR THE PRODUCTION OF HIGH-FREQUENCY OSCILLATIONS BY MEANS OF ALTERNATING CURRENT AT LOW FREQUENCY.

Application filed February 7, 1922, Serial No. 534,732, and in Germany September 10, 1921.

This invention relates to an arrangement for the production of high-frequency oscillations by means of alternating current of low frequency.

In carrying out the present invention a coil with an iron core is inserted in an alternating current circuit. The magnetic resistance of the iron core and its sectional area are such that the core is magnetically saturated by a fraction of the resulting current strength in the circuit. Thus, in the magnetic flux produced thereby occurs very short alternations followed by longer intervals in which no further alteration takes place, due to the iron core being saturated. In a coil surrounding the iron core these short alternations of magnetic flux produce similar or short impulses of electromotive force. These short impulses of electromotive force can be utilized for shock-excitation of oscillatory circuits.

For producing oscillatory currents in the above manner, the impulses of electromotive force must occur periodically, and the natural frequency of the oscillatory currents produced must be a multiple of the fundamental frequency, viz, the frequency at which the alternating current causes the periodic impulses.

There are well known means for distorting the voltage of alternating current circuits, as for example, the use of direct current magnetizations for saturating the iron core of a coil interposed in alternating current circuit. The distorted voltage is used for frequency changing by utilizing higher harmonics.

By the present invention a different method of multiplying a fundamental frequency is employed. The short impulses of current which can be produced according to this invention are adapted to load suddenly an oscillatory circuit. During the interval the induced voltage is zero, the loaded circuit oscillates with its natural frequency. Although these oscillations are somewhat damped, every new impulse drives the oscillations up to their initial amplitude.

Figure 1:
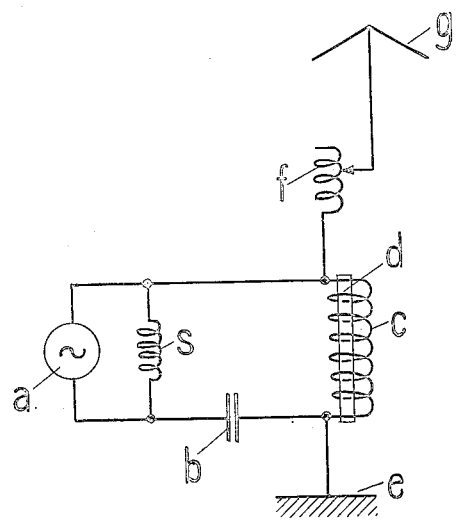

Referring to the accompanying drawing:

Fig. 1 is a diagrammatic view of an apparatus embodying my invention for producing radio oscillations.

Figure 2A:
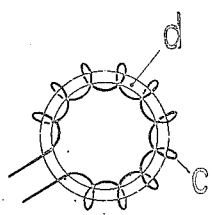
Figure 2B:
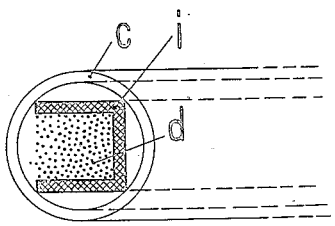

Fig. 2ᵃ is a view of a modified form of transformer.

Fig. 2ᵇ is a sectional view thereof.

A high frequency current source $a$ (Fig. 1) such as a high frequency machine to which a self-induction coil $s$ can be coupled in parallel is in circuit with a condenser $b$ and a coil $c$ which contains an iron core $d$. This system is adjusted to the frequency of the alternate current source $a$, so that with a given tension of the alternate current source large currents are developed, and the core $d$ is saturated for a long time.

The transformer $c$ with the iron core $d$ (Fig. 2ᵃ) is preferably composed of a ring of thin separate wires $c$ (Fig. 2ᵇ) which are insulated from one another. The winding $c$, for the purpose of more effective cooling and insulation is not wound directly upon the iron core $d$ but is kept at a certain distance from the core by means of the insulation $i$. It is advisable to cool the transformer by means of oil.

The oscillatory system which is to be produced in a higher frequency, such as an aerial telegraph, comprising the antenna $g$ the coil $f$ and the earth connection $e$ can be connected either to a secondary winding of the transformer, or simply be directly attached to a part on the whole coil $c$. The system $e\ c\ d\ f\ g$ must then be adjusted to the higher frequency, which represents an uneven multiple of the basic frequency.

On each half cycle of the primary current the working action of the system may be considered as divided into two periods, i. e., a very short and abrupt impulse period, and a very much longer saturation or free oscillation period. During the impulse period, and while the exchange of energy takes place between the oscillation and antenna circuits, the load impedance of the transformer coil is at its maximum value and the transformer may be considered as acting as a load circuit, receiving energy from the primary current in the oscillation circuit. During the saturation or oscillation period, however, the impedance of the coil drops considerably, due to saturation, so that the transformer serves in effect as a closed switch, shorting the transformer coil, so that the work circuit then oscillates at its own frequency, and to a greater or less extent excluding the flow of primary current owing to the great difference in frequencies between the primary and secondary currents, at the high transformation ratios for which the system is designed. There is present therefore, a varying impedance of transformer in the primary or low frequency circuit, resulting in very abrupt and varying load changes during and between successive impulse actions and in the flow of high wattless currents in said circuit. Due to this fact it is evident that if this circuit were merely tuned by means of a series condenser and the comparatively small generator impedance, it would be unstable and out of electrical balance with the generator, which latter would not only be working directly against and influenced in its current supplying actions by a circuit presenting highly changing load conditions, but at the same time would be subject to the efficiency losses incident to the flow through it of the wattless currents. Under the conditions mentioned, as the transformer operates with very high saturation values, the primary current would be distorted to a large extent and a broad voltage curve (instead of voltage impulses) representing only low harmonics of small magnitude would be obtained accompanied by a heavy load on the generator. Successful impulse operation in accordance with the principle of my invention, on the other hand, is based upon the supply of a sinusoidal or substantially sinusoidal primary current, which, through the iron core saturation, produces a substantially rectangular-shaped flux field in the iron core which is responsible for the very steep and pronounced tension peaks induced in the transformer winding and which are necessary for impulse excitation. It is, therefore, essential to so control and coordinate the functions of the oscillation circuit and the generator that a primary current of sinusoidal or approximating sinusoidal shape will be supplied, the generator being protected against efficiency losses so that a maximum power output therefrom will be obtained, and the working action rendered such that sharply pronounced impulses of maximum amplitude and following each other in properly timed sequence will be produced. For the purpose of so stabilizing the oscillation circuit and protecting and controlling the action of the generator the inductance coil S is employed. This coil S coacts with the condenser $b$ in series with it to tune the oscillation circuit to the generator frequency. The inductance being in series with the transformer forms part of the circuit including therewith the transformer winding $c$ and capacity $b$ and presents therein a reactive impedance to the flow of the primary alternating current, which impedance is directly proportional to the frequency. Thus this inductance S in the primary circuit adjusts this circuit so as to keep the current shape close to sinusoidal form. It will be evident, of course, that, with this impulse excitation system of operation, the closer the action of the transformer approximates that of a pure switch, the closer will be the shape of the primary current to that of a current of purely sinusoidal shape, and the sharper and more pronounced will be the tension impulses impinging upon the work circuit. The inductance S, therefore, by adjusting the primary circuit to keep the current close to sinusoidal form ensures a switch-like action of the transformer whereby interreactions between the primary and work circuits are reduced and minimized, resulting in the production of much more sharply defined, i. e., more distinctive and purer, oscillations in the work circuit. By placing the inductance S in parallel with the generator, the generator may, as shown, be directly (conductively) connected to the oscillation circuit, and to the terminals of the transformer coil, as with this arrangement the inductance blocks the flow of the wattless currents from the primary circuit to the generator whereby generator losses due to the flow of the wattless currents therethrough are overcome, the apparatus simplified, and the efficiency of the generator and of the apparatus as a whole greatly increased. Such function of the so-arranged inductance S follows from the fact that when the system is adjusted for most favorable operation, the circuit containing generator $a$, capacity $b$, transformer winding $c$ and inductance S is so tuned with respect to the generator frequency that a leading reactive current flows in this circuit. This current is prevented from flowing through the generator by the inductance S, which, according to well known alternating current laws, draws a lagging current compensating for the leading current. Thus by the use of the inductance S a sinusoidal or substantially sinusoidal current required for an impulse excitation transformer action will always be furnished by the generator, and the generator will be prevented from getting out of step and will be maintained in a state of electrical working equilibrium with said circuit, so that a proper coactive timing of the working functions of the acting elements will be obtained for the production of free impulse oscillation trains in the secondary or work circuit of almost equal amplitude and at regular and uniform periods. Hence by the use of a single oscillation circuit, containing a single impulse excitation transformer, impulses may be produced which follow each other in such timed sequence as to produce a substantially continuous radio frequency current.

As considerable losses of energy can be avoided in the entire system of lower frequency, because the ohmic resistances and the iron losses can be kept very small by suitable division of the iron, almost the total energy of the apparatus can be transformed into the higher frequency with extremely good efficiency.

If it is desired to vary the frequency it is only necessary to adjust the last oscillation circuit to the required frequency, care being taken to fulfil the condition that the new frequency is an uneven multiple of the original frequency.

In practice it has been found, that the degree of efficiency remains about the same whether the apparatus developes a frequency triple, nine-fold or even twenty-seven fold.

I claim:

1. In an apparatus for generating high frequency oscillations, an alternating current generator of a fundamental frequency, an impulse excitation transformer, an oscillation circuit supplied with current from the generator and including the coil of the transformer, a work circuit associated with the said transformer and tuned to a frequency which is an uneven multiple of the fundamental frequency, and means for tuning the oscillation circuit to the fundamental frequency and preventing the wattless currents in said circuit from circulating in the generator while compensating for load variations in said circuit due to impedance variations of the transformer.

2. In an apparatus for generating high frequency oscillations, an alternating current generator of a fundamental frequency, an impulse excitation transformer, an oscillation circuit supplied with current from the generator and including the coil of the transformer, a work circuit associated with the said transformer and tuned to a frequency which is an uneven multiple of the fundamental frequency, and means for tuning the oscillation circuit to the fundamental frequency, said means including an element connected across the terminals of the generator for preventing the wattless currents in said circuit from circulating in the generator while compensating for load variations in said circuit due to impedance variations of the transformer.

3. In an apparatus for generating high frequency oscillations, an impulse excitation transformer, an oscillation circuit including the coil of said transformer, an alternating current generator of a fundamental frequency included in said circuit and having its terminals connected to the terminals of the coil, a work circuit associated with the said transformer and tuned to a frequency which is an uneven multiple of the fundamental frequency, and means for tuning the oscillation circuit to the fundamental frequency, said means including an element in parallel with the transformer coil and connected to the terminals of the generator for preventing the wattless currents in the oscillation circuit from flowing in the generator while compensating for load variations in said circuit due to impedance variations of the transformer.

4. In an apparatus for generating high frequency oscillations, an alternating current generator of a fundamental frequency, an impulse excitation transformer, an oscillation circuit supplied with current from the generator and including the coil of the transformer, a work circuit associated with the said transformer and tuned to a frequency which is an uneven multiple of the fundamental frequency, tuning means in the oscillation circuit in series with the transformer coil, and tuning and stabilizing means in the oscillation circuit in parallel with the coil and connected with the terminals of the generator.

5. In an apparatus for generating high frequency oscillations, an alternating current generator of a fundamental frequency, an impulse excitation transformer, an oscillation circuit supplied with current from the generator and including the coil of the transformer, a work circuit associated with the said transformer and tuned to a frequency which is an uneven multiple of the fundamental frequency, tuning means in the oscillation circuit in series with the transformer coil, and a tuning and stabilizing inductance in the oscillation circuit in parallel with the transformer coil and connected with the terminals of the generator.

6. In an apparatus for generating high frequency oscillations, an alternating current generator of a fundamental frequency, an impulse excitation transformer, an oscillation circuit supplied with current from the generator and including the coil of the transformer, a work circuit associated with the said transformer and tuned to a frequency which is an uneven multiple of the fundamental frequency, a tuning condenser in the oscillation circuit in series with the transformer coil, and a tuning inductance in the oscillation circuit in parallel with the transformer coil and connected with the terminals of the generator.

7. In an apparatus for generating high frequency oscillations, an impulse excitation transformer, an oscillation circuit including the coil of said transformer, an alternating current generator of a fundamental frequency arranged in said circuit and connected with the terminals of the transformer coil, a work circuit associated with the said transformer and tuned to a frequency which is an uneven multiple of the fundamental frequency, tuning means in the oscillation circuit in series with the transformer coil, and tuning and stabilizing means in the oscillation circuit in parallel with the coil and connected with the terminals of the generator.

8. In an apparatus for generating high frequency oscillations, an impulse excitation transformer, a primary oscillation circuit for a fundamental frequency including the coil of said transformer, a generator for supplying said fundamental frequency, a secondary work circuit associated with said transformer and tuned to a frequency which is an uneven multiple of the fundamental frequency, means for tuning said oscillation circuit to the fundamental frequency, said means including a stabilizing inductance in series with said transformer coil, and circuit connections between said generator and said oscillation circuit.

In testimony whereof I have signed this specification.

OTTO SCHELLER.